US012654625B2

(12) United States Patent

Levine et al.

(10) Patent No.: US 12,654,625 B2

(45) Date of Patent: Jun. 16, 2026

(54) BASE PLATE ADAPTORS FOR ACCESSORIES

(71) Applicant: Ford Global Technologies, LLC, Dearborn, MI (US)

(72) Inventors: Eric Scott Levine, Novi, MI (US); Matthew B. Rutman, Westland, MI (US); Stuart C. Salter, White Lake, MI (US); Ming Hong Choi, Lasalle (CA)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 18/206,136

(22) Filed: Jun. 6, 2023

(65) Prior Publication Data

US 2024/0409036 A1 Dec. 12, 2024

(51) Int. Cl.
B60R 9/06 (2006.01)
B60R 16/03 (2006.01)

(52) U.S. Cl.
CPC .............. B60R 9/065 (2013.01); B60R 16/03 (2013.01)

(58) Field of Classification Search
CPC ................................ B60R 9/065; B60R 16/03
USPC .......................................................... 224/495
See application file for complete search history.

(56) References Cited

U.S. PATENT DOCUMENTS

| 5,762,244 | A | * | 6/1998 | Wagner | B60R 11/00 |
| | | | | | 224/281 |
| 6,367,701 | B1 | * | 4/2002 | Fries | G06K 19/07749 |
| | | | | | 235/492 |
| 6,851,735 | B2 | * | 2/2005 | Hicks | B60R 7/02 |
| | | | | | 224/511 |
| 10,505,326 | B2 | * | 12/2019 | Chien | H01R 13/70 |
| 10,583,962 | B2 | | 3/2020 | Brunner et al. | |
| 10,703,534 | B2 | | 7/2020 | Brunner et al. | |
| 10,744,925 | B1 | | 8/2020 | Horst | |
| D895,966 | S | | 9/2020 | Brunner et al. | |
| D895,967 | S | | 9/2020 | Brunner et al. | |
| D896,517 | S | | 9/2020 | Brunner et al. | |
| D896,518 | S | | 9/2020 | Brunner et al. | |
| D897,103 | S | | 9/2020 | Brunner et al. | |
| D898,320 | S | | 10/2020 | Brunner et al. | |
| 10,933,796 | B2 | * | 3/2021 | Beenen | B60R 9/06 |
| 10,962,218 | B2 | | 3/2021 | Plato et al. | |
| 10,981,696 | B2 | | 4/2021 | Brunner et al. | |
| D917,977 | S | | 5/2021 | Brunner et al. | |
| D918,584 | S | | 5/2021 | Brunner et al. | |
| D919,296 | S | | 5/2021 | Brunner et al. | |
| 11,008,136 | B2 | | 5/2021 | Brunner et al. | |

(Continued)

OTHER PUBLICATIONS

US 10,947,009 B2, 03/2021, Brunner et al. (withdrawn)

*Primary Examiner* — Peter N Helvey

(74) *Attorney, Agent, or Firm* — Vichit Chea; Carlson, Gaskey & Olds, P.C.

(57) ABSTRACT

An adaptor for an accessory attachment system comprises a body having a first side and a second side opposite of the first side. The first side has a first mounting configuration that is configured to be received within a first pattern of apertures on a base plate. The second side has a second mounting configuration that is different than the first mounting configuration such that an accessory having the second mounting configuration configured to interact with a second pattern of apertures different than the first pattern of apertures can be mounted to the base plate via the body.

23 Claims, 12 Drawing Sheets

(56)         References Cited

U.S. PATENT DOCUMENTS

| D920,671 S | 6/2021 | Brunner et al. |
| 11,027,883 B1 | 6/2021 | Brunner et al. |
| D923,935 S | 7/2021 | Brunner et al. |
| 11,192,690 B1 | 12/2021 | Brunner et al. |
| 11,268,691 B2 | 3/2022 | Plato et al. |
| 11,279,421 B1 * | 3/2022 | Hoogendoorn ........... B60R 9/06 |
| 11,365,026 B2 | 6/2022 | Brunner et al. |
| 11,427,382 B2 | 8/2022 | Brunner et al. |
| 11,465,805 B2 | 10/2022 | Brunner et al. |
| 12,319,239 B2 * | 6/2025 | Hoch ........................ B60R 9/08 |
| 2001/0004157 A1 | 6/2001 | Lance et al. |
| 2009/0014602 A1 * | 1/2009 | Frost ........................ B60R 7/08 |
| | | 248/100 |
| 2010/0096977 A1 * | 4/2010 | Lee ........................... F21K 9/62 |
| | | 313/503 |
| 2015/0283953 A1 | 10/2015 | Romanelli |
| 2015/0340826 A1 * | 11/2015 | Chien ..................... F21V 33/00 |
| | | 439/490 |
| 2016/0031383 A1 * | 2/2016 | Squicciarini ............ B60R 11/06 |
| | | 224/281 |
| 2020/0116533 A1 * | 4/2020 | Read ........................ F24F 11/56 |
| 2022/0258323 A1 | 8/2022 | Hoppe et al. |
| 2022/0344919 A1 * | 10/2022 | Zheng ..................... H02G 3/08 |
| 2022/0380089 A1 | 12/2022 | Brunner et al. |

* cited by examiner

BASE PLATE ADAPTORS FOR ACCESSORIES

TECHNICAL FIELD

This disclosure relates generally to a base plate with apertures that is used to secure accessories within a cargo or work area, and more particularly, the disclosure relates to an adaptor that has a first side with a mounting configuration that fits into existing apertures of the base plate and a second side that can accommodate a mounting configuration that is different than the mounting configuration on the first side.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite. Support surfaces in cargo or work areas may be configured to securely support the accessories.

SUMMARY

In some aspects, the techniques described herein relate to an adaptor for an accessory attachment system, including: a body having a first side and a second side opposite of the first side; wherein the first side has a first mounting configuration that is configured to be received within a first pattern of apertures on a base plate; and wherein the second side has a second mounting configuration that is different than the first mounting configuration such that an accessory having the second mounting configuration is configured to interact with a second pattern of apertures different than the first pattern of apertures can be mounted to the base plate via the body.

In some aspects, the techniques described herein relate to an adaptor for an accessory attachment system, wherein the body comprises a plate having a plurality of cleats extending outwardly of the first side to provide the first mounting configuration, and the plate having a plurality of recesses, a plurality of protrusions, and/or at least one latching feature on the second side to provide the second mounting configuration.

In some aspects, the techniques described herein relate to an adaptor for an accessory attachment system that includes a latch that is configured to secure the body to the base plate.

In some aspects, the techniques described herein relate to an adaptor for an accessory attachment system, wherein the latch comprises a lever arm that is movable between a latched position and an unlatched position, and including a resilient member that biases the lever arm to the latched position.

In some aspects, the techniques described herein relate to an adaptor for an accessory attachment system, wherein the body comprises a plate having a plurality of cleats extending outwardly of the first side to provide the first mounting configuration, and wherein the plate includes at least one latching feature on the second side that is configured to couple with the accessory.

In some aspects, the techniques described herein relate to an adaptor for an accessory attachment system, wherein the body is comprised of a material that has long persistent phosphor molded within to provide passive lighting for a predetermined amount of time, and/or wherein the body includes an integrated lighting element.

In some aspects, the techniques described herein relate to an adaptor for an accessory attachment system, wherein the body includes a power transfer area configured to transfer power from the base plate to the accessory via the body.

In some aspects, the techniques described herein relate to an adaptor for an accessory attachment system, wherein the power transfer area comprises a body charging member configured to interact with a base plate charging member and including a connector interface to connect the accessory to the body charging member for direct charging.

In some aspects, the techniques described herein relate to an adaptor for an accessory attachment system, wherein the power transfer area comprises a converter and an inductive charging member configured to interact with a base plate inductive charging member for inductive charging of the accessory via an accessory inductive charging member.

In some aspects, the techniques described herein relate to an accessory attachment system, including: a base plate including a plurality of apertures, wherein at least a first set of apertures of the plurality of apertures provides a first mounting configuration for a first type of accessory to be mounted on the base plate; and an adaptor having a first side with the first mounting configuration and a second side having a second mounting configuration that is different than the first mounting configuration such that a second type of accessory with the second mounting configuration can be mounted to the base plate via the adaptor.

In some aspects, the techniques described herein relate to an accessory attachment system, wherein the adaptor comprises a plate having a plurality of cleats extending outwardly of the first side to provide the first mounting configuration, and the plate having a plurality of recesses, a plurality of depressions, and/or at least one latching feature on the second side to provide the second mounting configuration.

In some aspects, the techniques described herein relate to an accessory attachment system, wherein the adaptor includes a latch that is configured to secure the adaptor to the base plate.

In some aspects, the techniques described herein relate to an accessory attachment system, wherein the latch comprises a lever arm that is movable between a latched position and an unlatched position, and including a resilient member that biases the lever arm to the latched position.

In some aspects, the techniques described herein relate to an accessory attachment system, wherein the adaptor comprises a plate having a plurality of cleats extending outwardly of the first side to provide the first mounting configuration, and the plate having at least one latching feature on the second side that is configured to couple with the second type of accessory.

In some aspects, the techniques described herein relate to an accessory attachment system, wherein the adaptor is comprised of a material that has long persistent phosphor molded in to provide passive lighting for a predetermined amount of time, and/or wherein the adaptor includes an integrated lighting element.

In some aspects, the techniques described herein relate to an accessory attachment system, wherein the adaptor includes a power transfer area configured to transfer power from the base plate to the accessory via the adaptor, and wherein the power transfer area comprises an adaptor charging member configured to interact with a base plate charging member and including a connector to connect to the accessory to the adaptor charging member for direct charging.

In some aspects, the techniques described herein relate to an accessory attachment system, wherein the adaptor includes a power transfer area configured to transfer power from the base plate to the accessory via the adaptor, and wherein the power transfer area comprises a converter and an adaptor inductive charging member configured to interact with a base plate inductive charging member for inductive charging of the accessory via an accessory inductive charging member.

In some aspects, the techniques described herein relate to an accessory attachment system, including: a base plate including a plurality of apertures: and an adaptor to attach an accessory to the base plate, wherein the adaptor comprises a single mounting puck that fits within one aperture of the plurality of apertures, and wherein the single mounting puck has a snap-retention feature to fit within the one aperture and a mount interface configured to interact with the accessory.

In some aspects, the techniques described herein relate to a method, including: forming an adaptor to have a first side with a first mounting configuration that is configured to be received within a first pattern of apertures on a base plate; and forming the adaptor to have a second side with a second mounting configuration that is different than the first mounting configuration such that an accessory having the second mounting configuration can be mounted to the base plate via the adaptor.

In some aspects, the techniques described herein relate to a method that includes forming the adaptor as a plate having a plurality of cleats extending outwardly of the first side to provide the first mounting configuration, and forming at least one latch feature and/or a plurality of recesses and/or depressions in the second side to provide the second mounting configuration.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a base plate that is used with an accessory attachment system for a vehicle or stationary application. The base plate provides an attachment interface for securing the accessories in place within a cargo or work area. Various types of accessories can be secured to the vehicle through the attachment interface provided by the base plate. The number and positions of base plates can be adjusted for particular vehicles or particular needs. For example, a vehicle may include side wall and/or floor mounted baseplates with a plurality of apertures that receive mounting feet or cleats associated with accessories or storage boxes.

There are often situations where it would be useful for the vehicle owner to be able to switch between accessories to enable different functional capabilities, or to temporarily remove an accessory or module to allow the module or its contents to be used off the vehicle, then reattach the module once the desired operation or task is completed. It is also useful to be able to provide power connection interfaces on the base plates to allow charging of accessories such as power tools, for example. In certain configurations, the accessories may not have mounting feet or cleats that would be able to fit in an aperture configuration provided on the base plate. The subject disclosure is directed to an adaptor that has a first side with a mounting configuration that fits into existing apertures of the base plate and a second side that can accommodate a mounting configuration for an accessory that is different than the mounting configuration on the first side. In one example, the adaptor has a latch or locking feature to hold the adaptor to the base plate, and the adaptor may also be configured to transfer power from the base plate, through the adaptor, to the accessory.

Figure 1A:
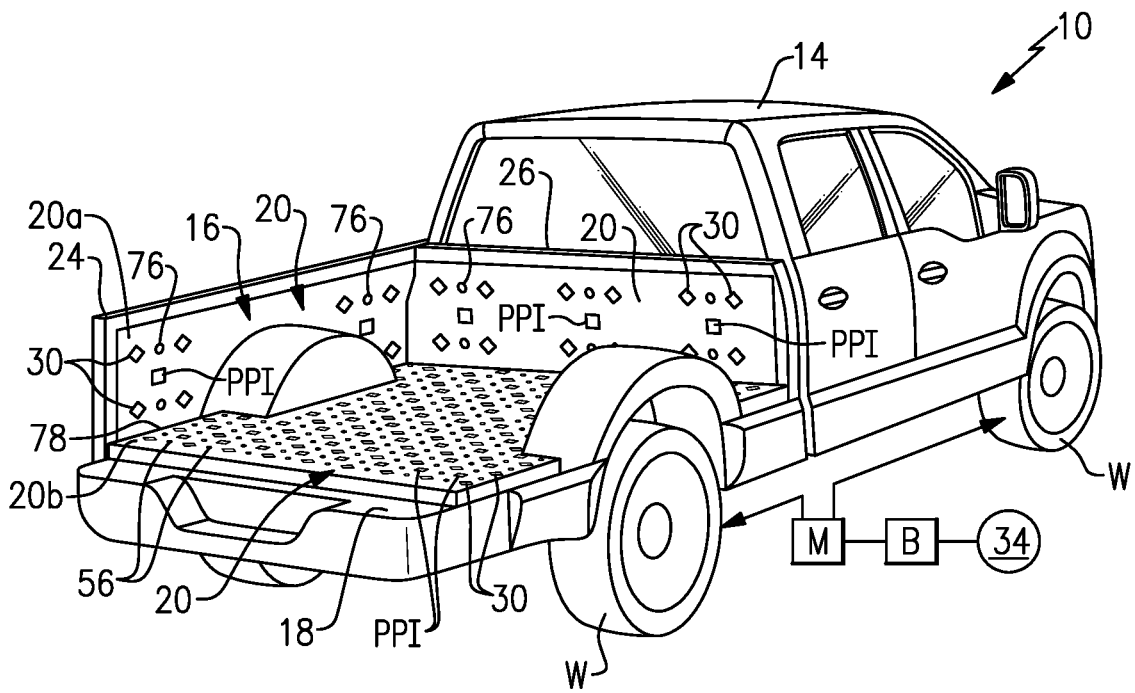
FIG. 1A illustrates a perspective view of a vehicle having a cargo bed equipped with base plates that can be used to secure an accessory according to an exemplary aspect of the present disclosure.
Figure 1B:
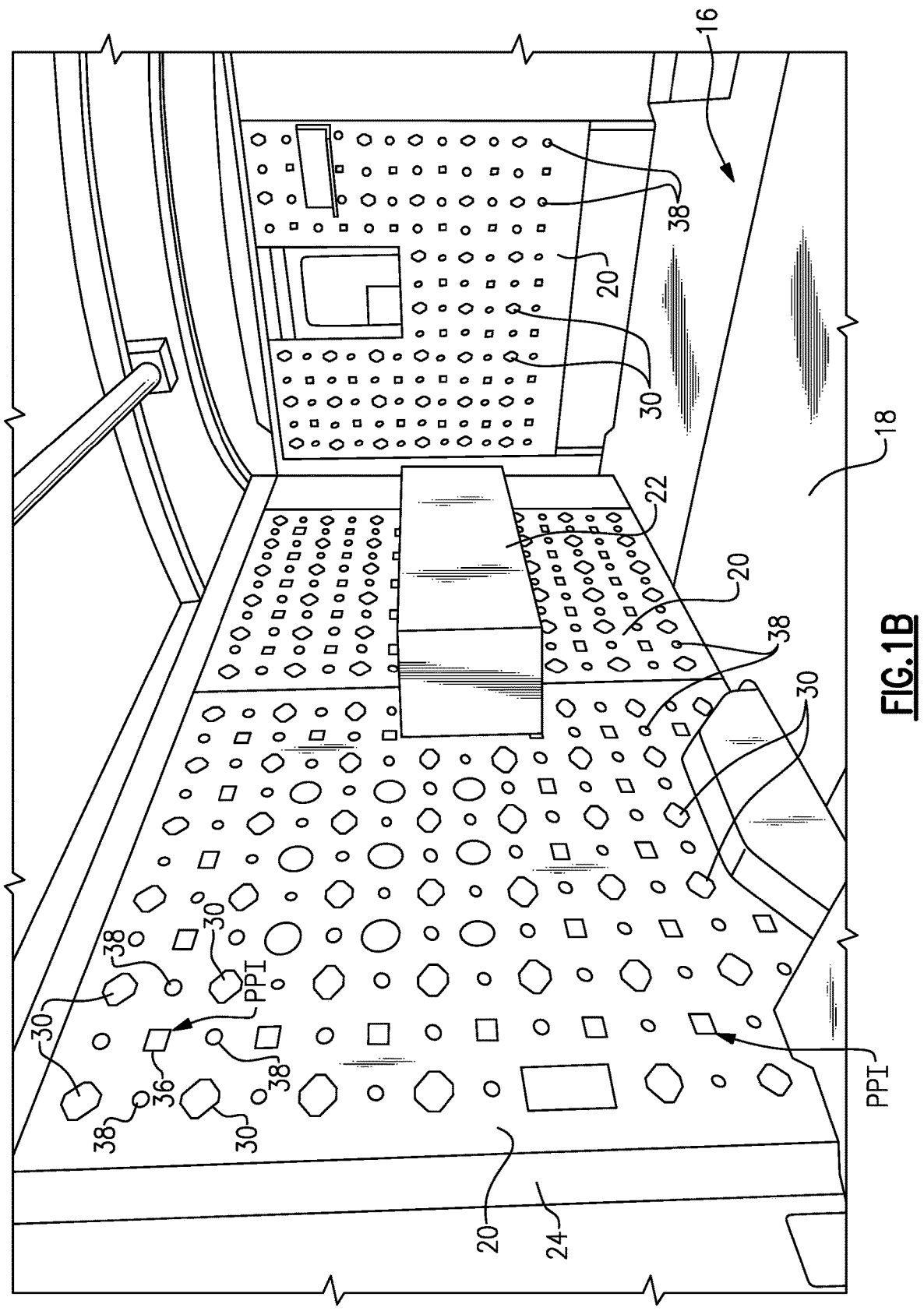
FIG. 1B illustrates a perspective view of a van having a cargo area equipped with base plates that can be used to secure accessories according to an exemplary aspect of the present disclosure.

With reference to FIGS. 1A-C and 2A-B, a vehicle 10 includes a passenger compartment 14 and a cargo bed 16 that is aft of the passenger compartment 14. The cargo bed 16 has a floor 18. In this example, the vehicle 10 is a pickup truck. However, the vehicle 10 could be another type of vehicle in another example, such as a car, van, sport utility vehicle, etc. FIG. 1B shows an example of a van that incorporates a base plate with an accessory attachment and locking system.

In one example, the vehicle 10 is an electrified vehicle and, in particular, a battery electric vehicle (BEV). In another example, the vehicle 10 could be another type of electrified vehicle, such as a plug-in hybrid electric vehicle (PHEV), or a conventional internal combustion engine vehicle. In another example, the vehicle could have any other type of propulsion system such as an internal combustion engine or alternative fuel based propulsion system, for example.

In particular, the example vehicle 10 includes an electrified powertrain capable of applying a torque from an electric machine M (e.g., an electric motor) to drive a pair of wheels W. The vehicle 10 can include a traction battery pack B, which powers the electric machine M and, potentially, other electrical loads of the vehicle 10.

Figure 1C:
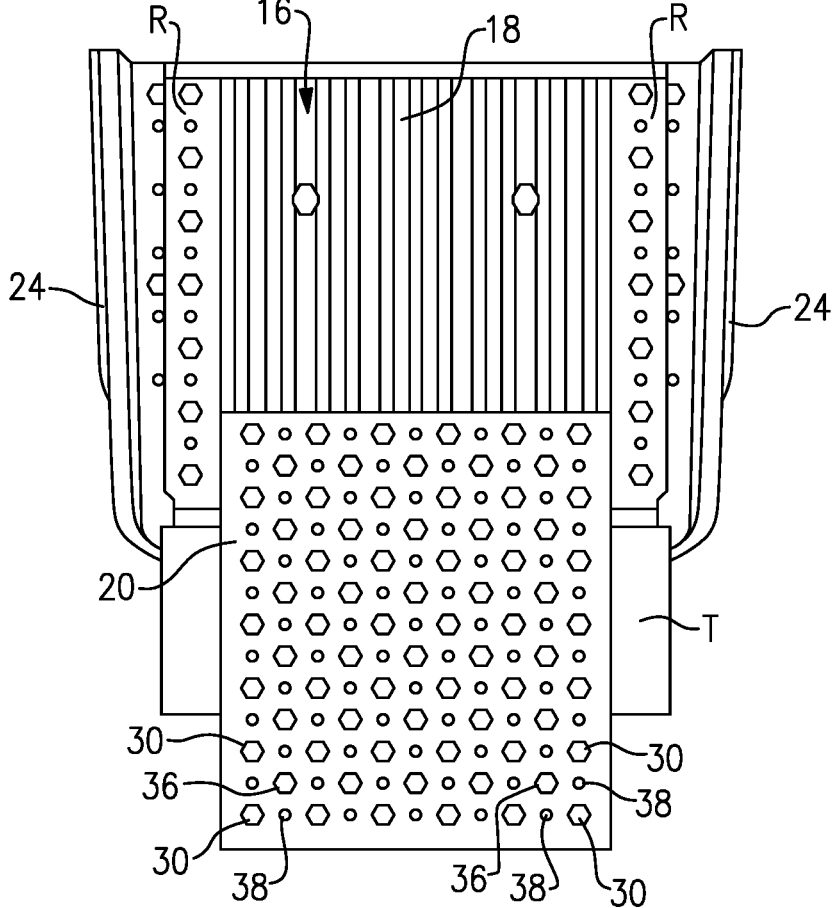
FIG. 1C illustrates a top view of a vehicle where the base plate can be slid out of the cargo area to make the base plate more accessible.

In the exemplary embodiment, a plurality of base plates 20 are used to support one or more accessories and/or modules 22. In one example, the cargo bed 16 is defined by a pair of side walls 24 (only one is shown in FIG. 1A for purposes of clarity), a rear wall 26, and a tailgate T (FIG. 1C). In one example, the base plates 20 are secured directly to walls 24, 26 and/or to the floor 18 of the cargo bed 16 by fastening, welding, etc., at a first connection interface. In another example shown in FIG. 1C, the base plates 20 can extend above the floor 18 and be supported for sliding movement within the cargo bed 16 on rails R or other types of sliding structures. The accessories and/or modules 22 can be secured to the vehicle 10 by engaging one or more of the base plates 20 via a second connection interface between the accessory 22 and the base plate 20. The accessories/modules 22 can comprise a lockable storage box that holds tools, a container, a refrigerator, etc. For example, the accessory 22 could be a lockable container having a lid L attached within hinges H (FIG. 2A), and which includes a compartment for storing power tools or other items that require power or data connection.

Figure 2A:
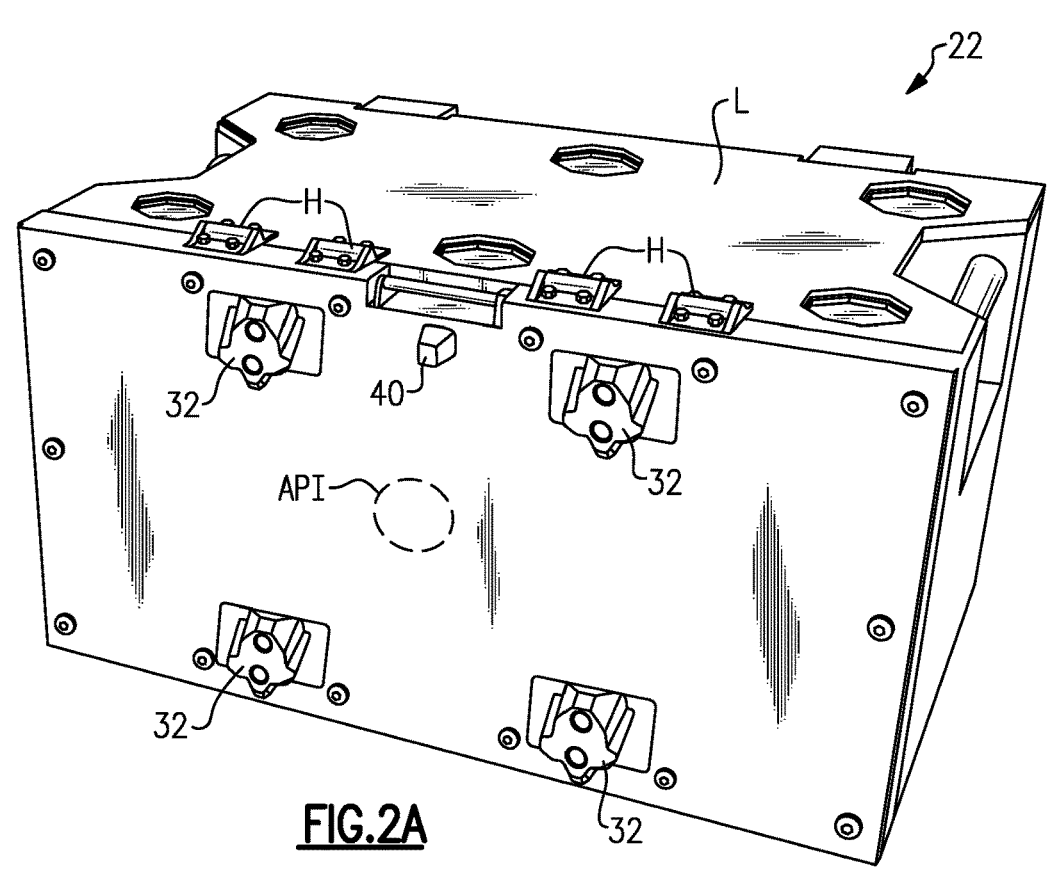
FIG. 2A illustrates a perspective view of an example accessory with side feet/cleats to be attached to a side wall base plate.

As shown in FIGS. 1A-1C, the base plates 20 include a plurality of openings or apertures 30. As shown in FIG. 2A, an example accessory 22 comprises a lockable container or box 22 that includes one or more cleats or mounting feet 32 on a side wall of the accessory 22. The box 22 can engage the base plate 20 using an attachment system comprising the plurality of apertures 30 and the mounting feet 32 that cooperate to provide a mechanical connection interface. In this example, the base plates 20 provide the apertures 30 and the accessories 22 include the feet 32. This could be rearranged, however, such that one or all of the feet 32 extend from the base plates 20 and the accessories 22 provide some or all of the apertures 30. The apertures 30 are spaced upwardly from the floor 18 or outwardly of the side wall 24, 26 by an open gap such that the feet 32 from the accessory 22 can be easily inserted into the base plate 20 to attach the accessory 22 to the base plate 20. The accessory 22 can then be removed and replaced with a different accessory 22 as needed. The user can, for example, hold tools for a certain type of job within the accessory 22. When the user needs to work on a different second type of job, the user can swap the accessory 22 for another accessory 22 having specialized tools for the second type of job.

As discussed above, in this example, the accessory 22 comprises a lockable box that is mechanically coupled to the vehicle 10 via the base plate 20. The accessory 22 could additionally include a power connection interface 34 (FIG. 1A) that would be able to supply power to the box itself as well as any tools/devices within the box that would require charging. The power connection interface 34 is powered from the vehicle power supply, such as the battery pack B, for example. Any devices within the lockable box, e.g. rechargeable tools, could be recharged when set within the box and coupled to a charging interface associated with the power connection interface 34 between the accessory 22 and the base plate 20.

Figure 2B:
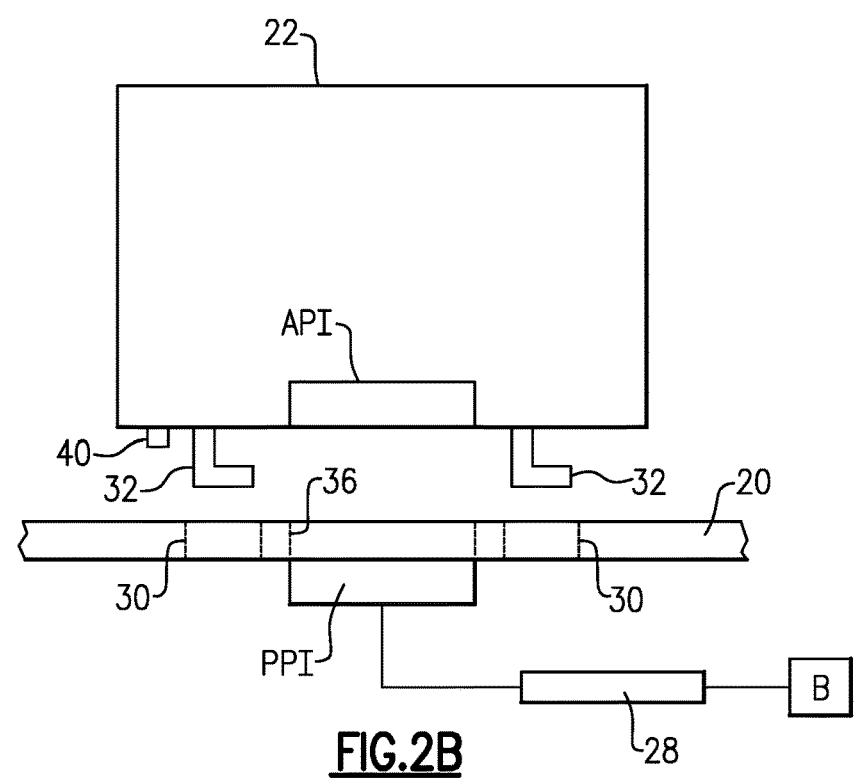
FIG. 2B illustrates a schematic view of an example accessory with bottom feet/cleats to be attached to a base plate extending over a vehicle floor, and which includes a wireless electrical power link.

In one example, the base plate 20 can also be plugged into either 12V vehicle power or other power sources via a variety of connections/outlets. These power sources supply power to charge or power the accessories 22 via the power supply connection interface 34 associated with the base plate 20. Each accessory 22 has an accessory power interface (API) as shown in FIGS. 2A-B. At least some, or all, of the mounting locations for an accessory 22 have a charging interface with a plate power interface (PPI) as shown in FIGS. 1A-1B. The API and the PPI can be a direct electrical connection or can be via an inductive wireless charging connection. The PPI receives vehicle power via the vehicle power supply B or other power source via a power distribution harness 28.

In one example, the accessory box 22 can comprise a side mounted attachment interface between the accessory box 22 and the base plate 20 (FIG. 2A) or can comprise a bottom mounted attachment (FIG. 2B). In the side mounted example, the cleats or feet 32 are on the side of the accessory 22 and the base plate 20 is configured to be positioned within the vehicle cargo bed 16 at the side wall 24 that extends upwardly from the floor surface of the truck bed in a vertical direction as shown in FIG. 1A, or at the side wall 24 in the van of FIG. 1B. In the bottom mounted example, the bottom of the accessory 22 includes the cleats or feet 32 which fit into apertures 30 formed in a base plate 20 that extends out over the floor 18 of the truck or van.

The apertures 30 are formed within the base plate 20 and comprise a plate attachment interface. The base plate 20 also includes an opening or aperture 36 for the PPI and an opening or aperture 38 for a locking feature that allows the accessory 22 to be securely locked to the base plate 20. These apertures 30, 36, 38 are provided at multiple locations on the base plate 20, and are formed in a desired pattern on the base plate 20 to allow for the accessories 22 to be mounted in various different locations and orientations as needed. When the accessory box 22 is attached to the base plate 20, the feet 32 are inserted into the corresponding apertures 30 to mechanically attach the accessory 22 to the base plate 20 in one of the plurality of mounting orientations. The accessory 22 can then be selectively detached from one mounting orientation on the base plate 20 such that the accessory 22 can immediately be reattached in a different one of the mounting orientations.

In one example, the box 22 is held in place by a mechanical locking system that is configured have a locked position where the accessory box 22 is prevented from being removed from the base plate 20 and an unlocked position where the accessory box 22 is allowed to be removed from the base plate 20. An example of such a locking system is found in application Ser. No. 17/993,345 filed on Nov. 23, 2022, which is assigned to the assignee of the subject application, and which is herein incorporated by reference. In one example, the locking mechanism comprises a button 40 that is resiliently biased to extend into the locking aperture 38 (FIGS. 1A-C) on the base plate 20 when the mounting feet 32 are fitted into the corresponding apertures 30 to provide the locked position.

Figure 3:
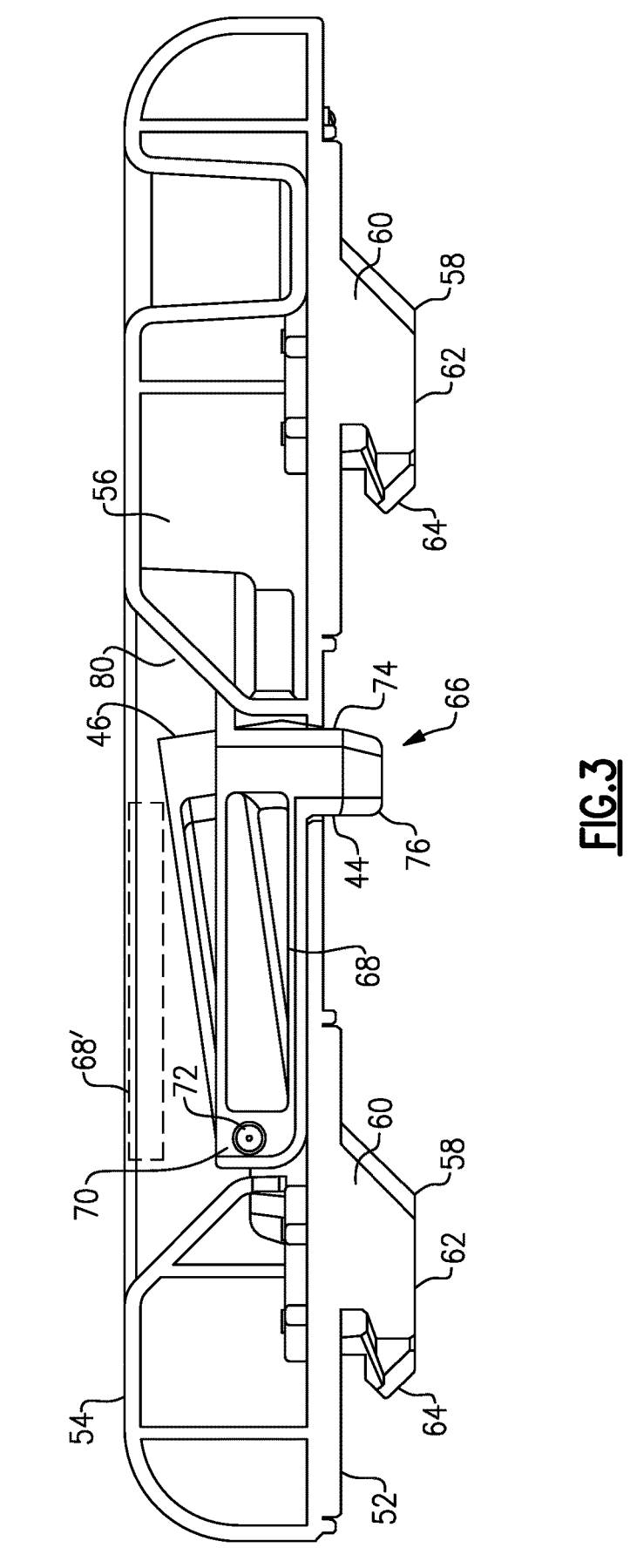
FIG. 3 is a side section view of an adaptor according to one example embodiment of the subject disclosure.
Figure 4:
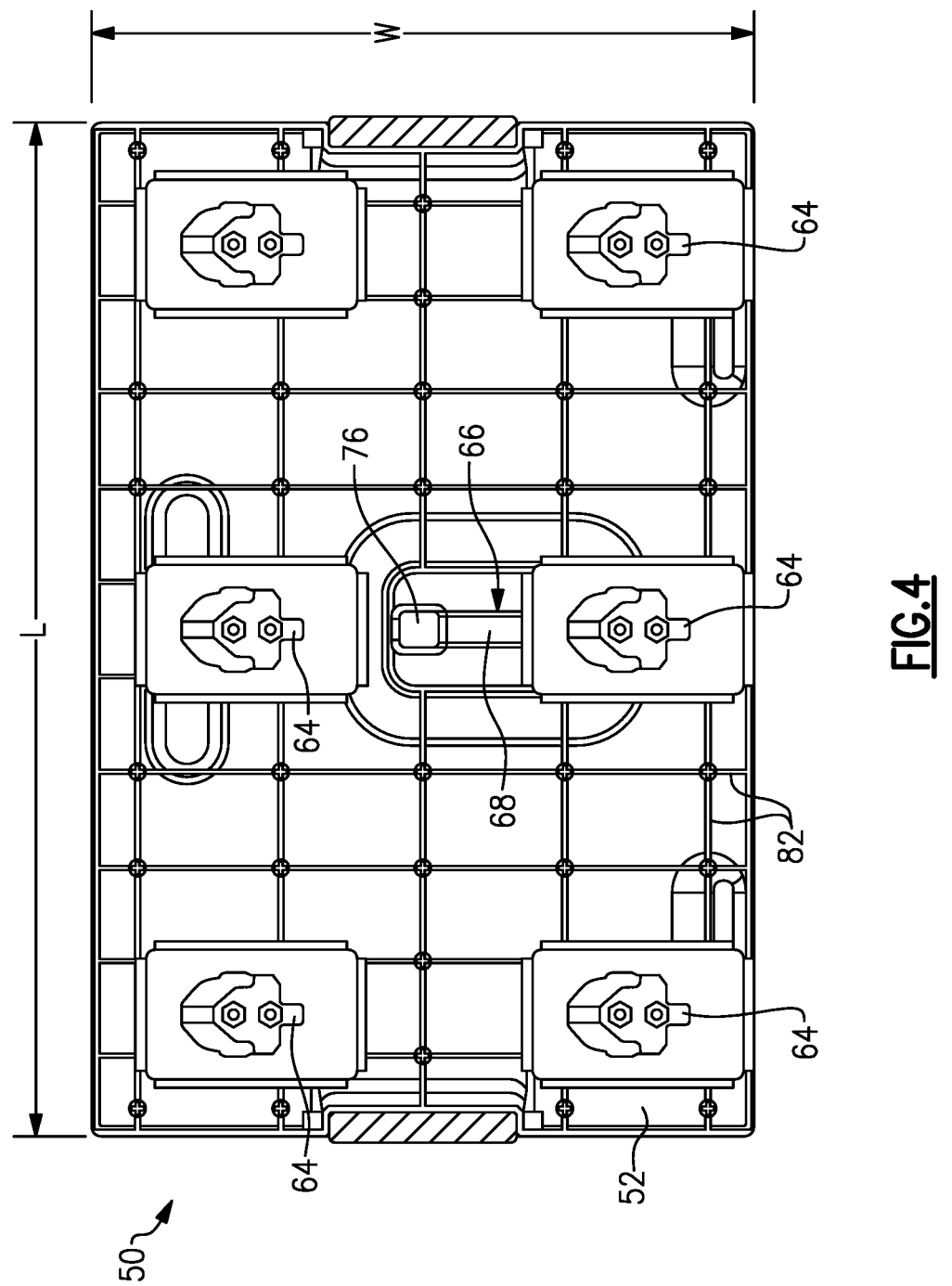
FIG. 4 is a bottom view of the adaptor of FIG. 3.
Figure 5:
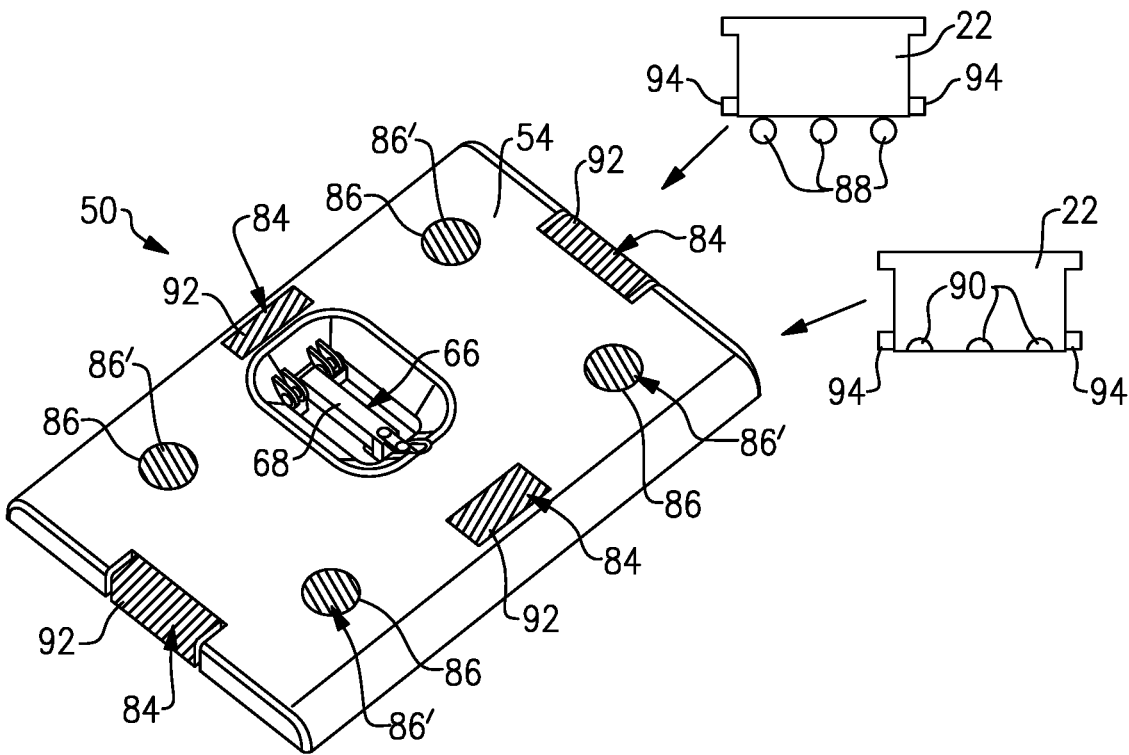
FIG. 5 is a top perspective view of the adaptor of FIG. 3.

The subject disclosure is directed to an adaptor 50 that has a first side 52 with a mounting configuration that fits into existing apertures of the base plate 20 and a second side 54 that can accommodate a mounting configuration for an accessory 22 that is different than the mounting configuration on the first side. FIGS. 3-5 show one example of the adaptor 50. In this example, the adaptor 50 comprises a body where the first side 52 has a first mounting configuration that is configured to be received within a first pattern of apertures 30 on the base plate 30 and the second side has a second mounting configuration that is different than the first mounting configuration. This allows an accessory that has the second mounting configuration to interact with a second pattern of apertures different than the first pattern of apertures such that the accessory can be mounted to the base plate 20 via the adaptor 50.

In one example, body of the adaptor comprises a plate 56 and the first mounting configuration on the first side 52 comprises a plurality of cleats or mounting feet 58 extending outwardly of the first side 52 as shown in FIG. 3. The cleats/feet 58 are similar to the cleats/feet 32 that are shown on the accessories 22 of FIGS. 2A-B. Each cleat/foot 58 has a base portion 60 and extends to a distal end 62. At the distal end 62 there is a transversely extending protrusion 64 on one side. Once the cleats/feet 58 are inserted through the apertures 30 in the base plate 20, the accessory 22 is slid along the surface of the base plate 20 by a small amount in the direction of the protrusion 64. The protrusion 64 is then positioned out of alignment with the aperture 30, such that if the accessory were to be pulled upwardly, the top of the protrusion 64 would contact a lower surface of the base plate 20 to prevent the accessory from inadvertently being removed from the apertures during travel, for example. To remove the accessory 22, the accessory is simply slid in the opposite direction until the protrusion 64 is aligned with the aperture 30 and then the cleats/feet 58 can be pulled out of the base plate 20.

In one example, the adaptor 50 includes at least six cleats or feet 58; however, the number of feet 58 can be varied as needed. Further, the feet 58 can be detached and the reattached in a different mounting orientation as described above with regard to the accessories 22. This allows an accessory, which does not have a mounting configuration that corresponds to the aperture configuration of the base plate 20, to be positioned at any orientation within the cargo area via the mounting face on the second side 54 of the adaptor 50.

In one example, the adaptor 50 includes a latch 66 that is configured to secure the adaptor plate 56 to the base plate 20. In this example, the latch 66 is centrally located on the plate 56 as shown in FIGS. 4-5. In one example, the latch 66 comprises a hammer or lever arm 68 that is pivotally coupled at one end 70 to the plate 56 via a pin 72. The lever arm 68 extends from the one end 70 to a second end 74 that pivots about an axis defined by the pin 72. The second end 74 pivots from a latched position where the second end 74 is latched to the base plate 20 (see 44) and an unlatched position where the second end 74 is unlatched from the base plate 20 (see 46). The latch 66 must be in the unlatched position in order to remove the adaptor 50 from the base plate 20. In one example, when in the latched position, the lever arm 68 extends in a first direction that is generally parallel to the second side 52 of the adaptor 50, and the second end 74 includes a hook member or latching portion 76 that extends in a second direction that is generally perpendicular to the first direction. Thus, the lever arm 68 comprises a generally L-shaped body.

In one example, the second end 74 of the lever arm 68 is resiliently biased to the latched position. In one example, a resilient member 78 (FIG. 7), such as a spring for example, is configured to bias the second end 74 to the latched position. In one example, the latch 66 is positioned on the adaptor 50 so that the latch 66 is accessible from the second side 54 and such that the latch 66 can be selectively moved between the latched and unlatched positions. The latch 66 can be received within a recess 80 formed within the second side 54, or the latch 66 could be positioned such that the lever arm is flush with the second side 54 as indicated at 68'. The lower surface of the accessory 22 would then rest on top of the lever arm 68' to prevent it from unlatching.

As shown in FIG. 4, the adaptor 50 has a width W and a length L that is greater than the width W. In the example shown in FIG. 4, the protrusions 64 of the cleats/feet 58 extend in a direction that is common with the width W. The first side 52 of the adaptor 50 may also include a plurality of reinforcing walls 82 to increase the rigidity of the adaptor 50.

FIG. 5 shows an example of the second side 54 of the adaptor 50. In this example, the plate 56 has at least one latching feature 84 on the second side 54 that is configured to couple with the accessory 22 and/or has a plurality of protrusions 86 or recesses 86' in the second side 54 to provide the adaptor 50 with the second mounting configuration. The number and location of the latching features 84 can be varied as needed dependent upon the mounting configuration that is located on a bottom surface of the accessory to be mounted on the second side 54. The number and location of the protrusions 86 and/or recesses 86' can be varied as needed dependent upon the mounting configuration that is located on a bottom surface of the accessory to be mounted on the second side 54. For example, the accessory 22 may include protruding members 88 that would be received within the recesses 86' as best seen in FIG. 5. Or, the accessory 22 may include recesses 90 that would receive protrusions 86.

In one example, the latching feature 84 comprises a gripping area 92 to which a latch 94 on an accessory 22 can latch on to in order to secure the accessory 22 to the adaptor 50. In another example, the positions of the gripping area 92 and latch 94 can be reversed.

The second side 54 may include only latching features 84. The second side 54 may include only protrusions 86 or only recesses 86'. The second side 54 may include protrusions 86 and recesses 86' in any combination. The second side 54 may also include any combination of latching features 84, protrusions 86, or recesses 86'.

Figure 6:
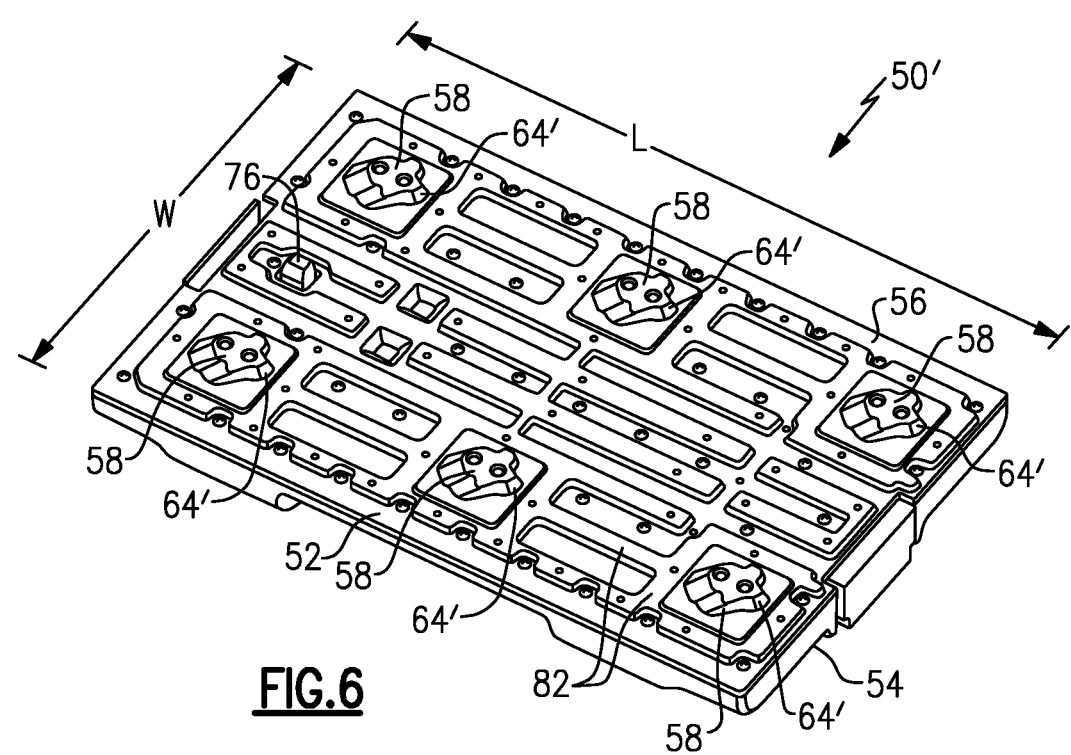
FIG. 6 is a bottom perspective view of another adaptor according to the subject disclosure.
Figure 7:
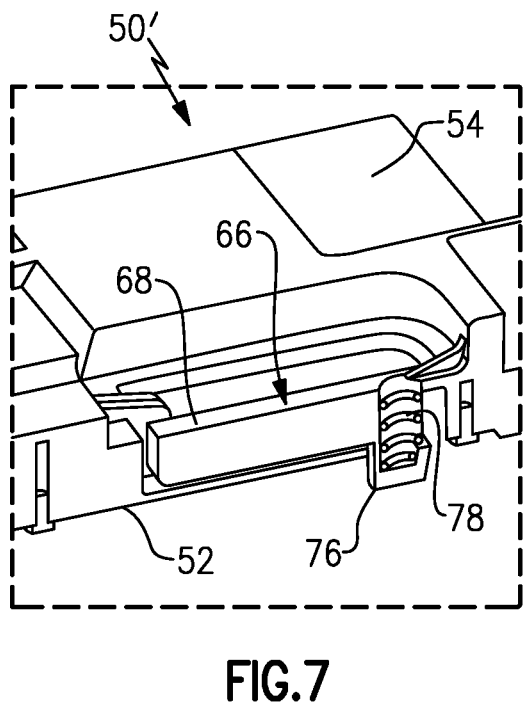
FIG. 7 is a side section view of a latch that can be used in any embodiment.
Figure 8:
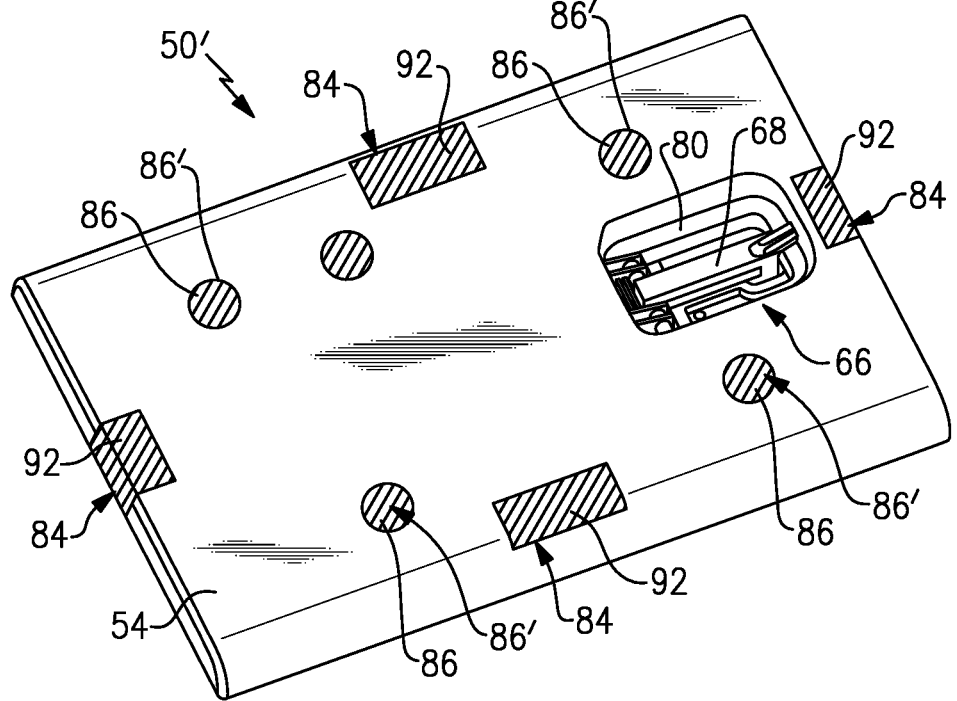
FIG. 8 is a top perspective view of the adaptor of FIG. 6.

FIGS. 6-8 show another example of an adaptor 50'. This example is similar to the adaptor 50 of FIGS. 3-5; however, in this example, the latch 66 is located near an edge of the adaptor 50'. Additionally, the protrusions 64' of the cleats/ feet 58' extend in a direction that is common with the length L.

Figure 10:
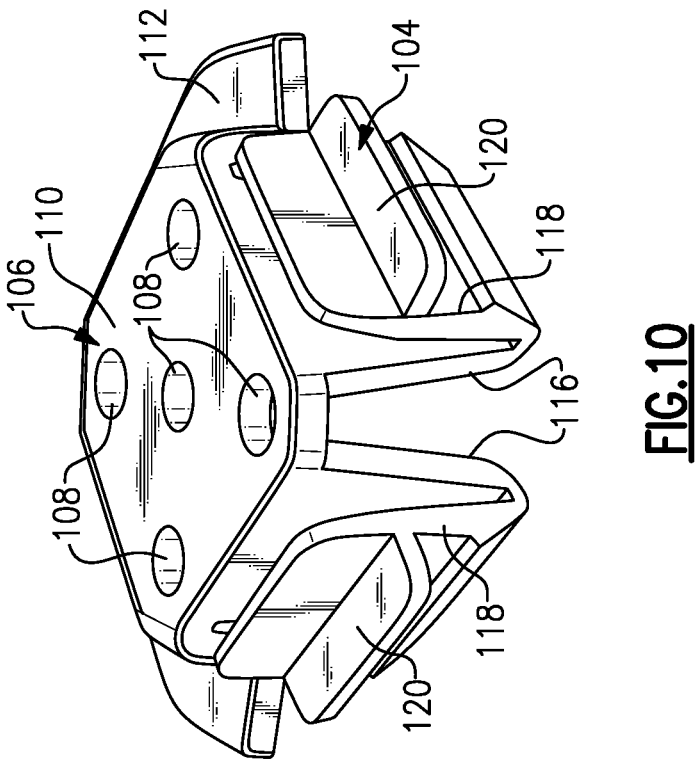
FIG. 10 is a perspective view of the single puck adaptor of FIG. 9.
Figure 9:
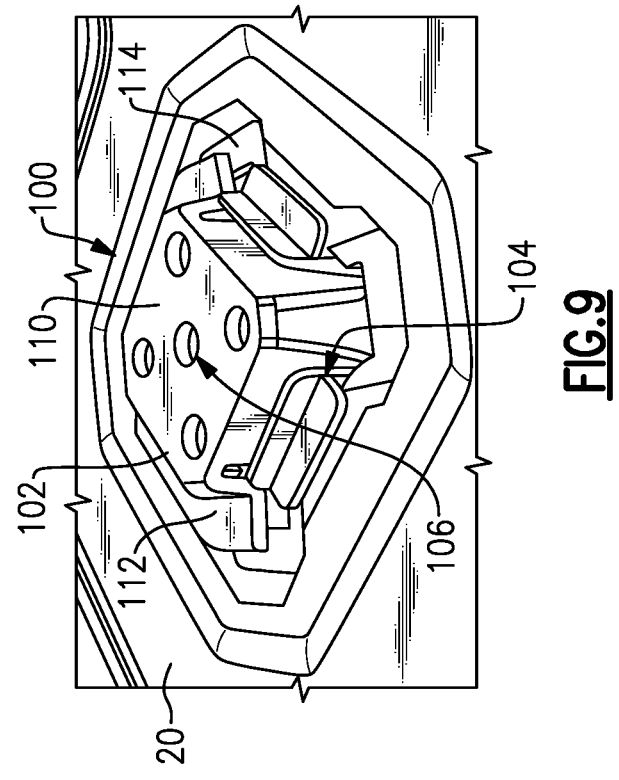
FIG. 9 is a top perspective view of a single puck adaptor as installed in a base plate.

FIGS. 9-10 disclose another example of an adaptor 100. In this example, the adaptor 100 comprises a single mounting puck 102 that fits within any one aperture 30 in the base plate 20 as shown in FIG. 9. This type of adaptor 100 is useful for small items that do not require power. For example, items such as cameras, first-aid kits, phones and other smart devices, etc. can be supported by the puck 102. In one example, the puck 102 has one or more snap-retention features 104 to fit within the aperture 30 and a mount interface 106 configured to interact with the accessory 22. In one example, the mount interface 106 comprises a plurality of fastening holes 108 that can be used to mount a bracket (not shown) to which a camera or phone could be attached. Optionally, a support for an item can be insert molded on to the back of the item and then attached to the puck 102.

In one example, the puck 102 has a flat support base 110 that includes the mount interface 106 and a flange portion 112 that at least partially surrounds the base 110 to rest on an upwardly facing surface 114 of the base plate 20. In one example, the snap-retention feature 104 comprises a downwardly extending leg 116 connected to an upwardly extending leg 118 in a resilient manner such that as the puck 102 is inserted into the aperture 30 the upwardly extending leg 118 is pressed inwardly toward the downwardly extending leg 116. In one example, the upwardly extending leg 118 includes a transversely extending flange 120 that snaps onto the base plate 20 as the upwardly extending leg 118 is pressed inwardly toward the downwardly extending leg 116 to provide a snap fit attachment. To remove the adaptor 100, the upwardly extending leg 118 is pressed further inward to release the snap fit such that the puck can be pulled upwardly out of the aperture 30.

Figure 11:
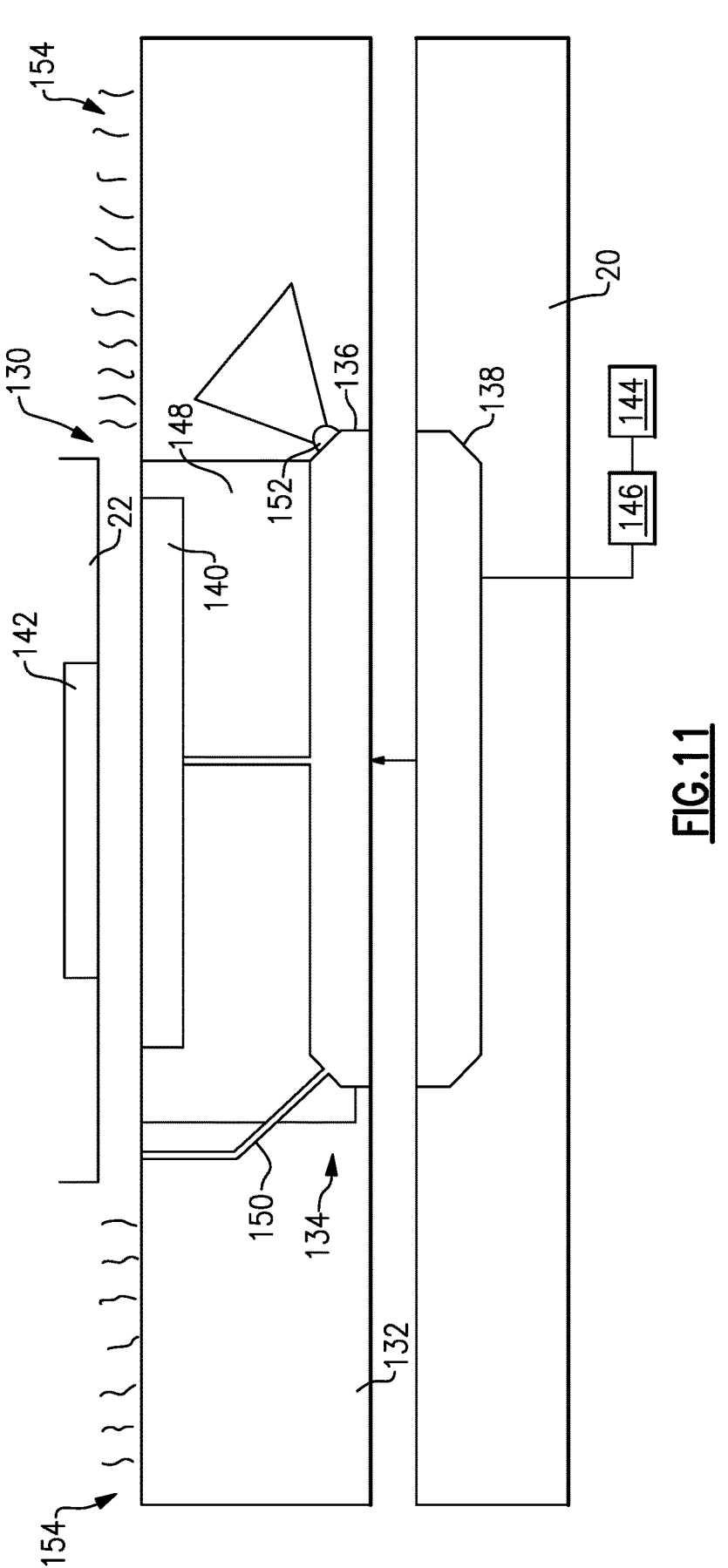
FIG. 11 is a schematic view of an adaptor with a charging interface.

An adaptor 130 can also be used to power an accessory from a power source supplied through the base plate 20 as shown in FIG. 11. In this example, the adaptor 130 comprises a plate 132 that includes a power transfer area 134 configured to transfer power from the base plate 20 to the accessory 22 via the adaptor plate 132. In one example, the power transfer area 134 comprises an adaptor charging member 136 configured to interact with a base plate charging member 138. An example of a base plate with a power transfer feature is found in application Ser. No. 17/716,053 filed on Apr. 8, 2022, which is assigned to the assignee of the subject application, and which is herein incorporated by reference.

In one example shown in FIG. 11, the adaptor charging member 136 and the base plate charging member 138 comprise inductive charging members. In one example, the base plate charging member 138 comprises inductive charger transmitter coil that is fixed to the baseplate 20 and the adaptor charging member 136 comprises an inductive charger receiver coil that is mounted to the adaptor 130. The inductive charger receiver coil is connected to a DCAC converter 140 such that power can be supplied to an accessory induction charging member 142. In one example, the base plate charging member 138 receives power from a vehicle power supply 144 via a power distribution harness 146. In one example, the inductive charger receiver coil and the DCAC converter 140 can be heat sunk by thermally conductive plastic which can be either insert or overmolded as indicated at 148.

In one example, a connector 150 can connect the adaptor charging member 136 directly to an accessory for direct charging. This allows an aftermarket 12V adaptor to charge tool batteries, for example, directly or a 120V adaptor can be plugged in.

In one example, the plate 132 can include one or more integrated lights 152, e.g. LEDs, that are powered by the adaptor charging member 136 to aid the user. In one example, the adaptor plate 132 comprises a molded plastic material and includes light piping for the lights 152. Optionally, a thermally conductive silicon material can be used to provide both heat sinking and to provide specific optics for the lights 152.

In one example, the adaptor is comprised of a material that has long persistent phosphor molded within to provide passive lighting (see 154 in FIG. 11) for a predetermined amount of time. Many applications are exposed to sunlight during the day at a worksite. The phosphor can be charged with only a brief exposure to the sun.

Figure 12:
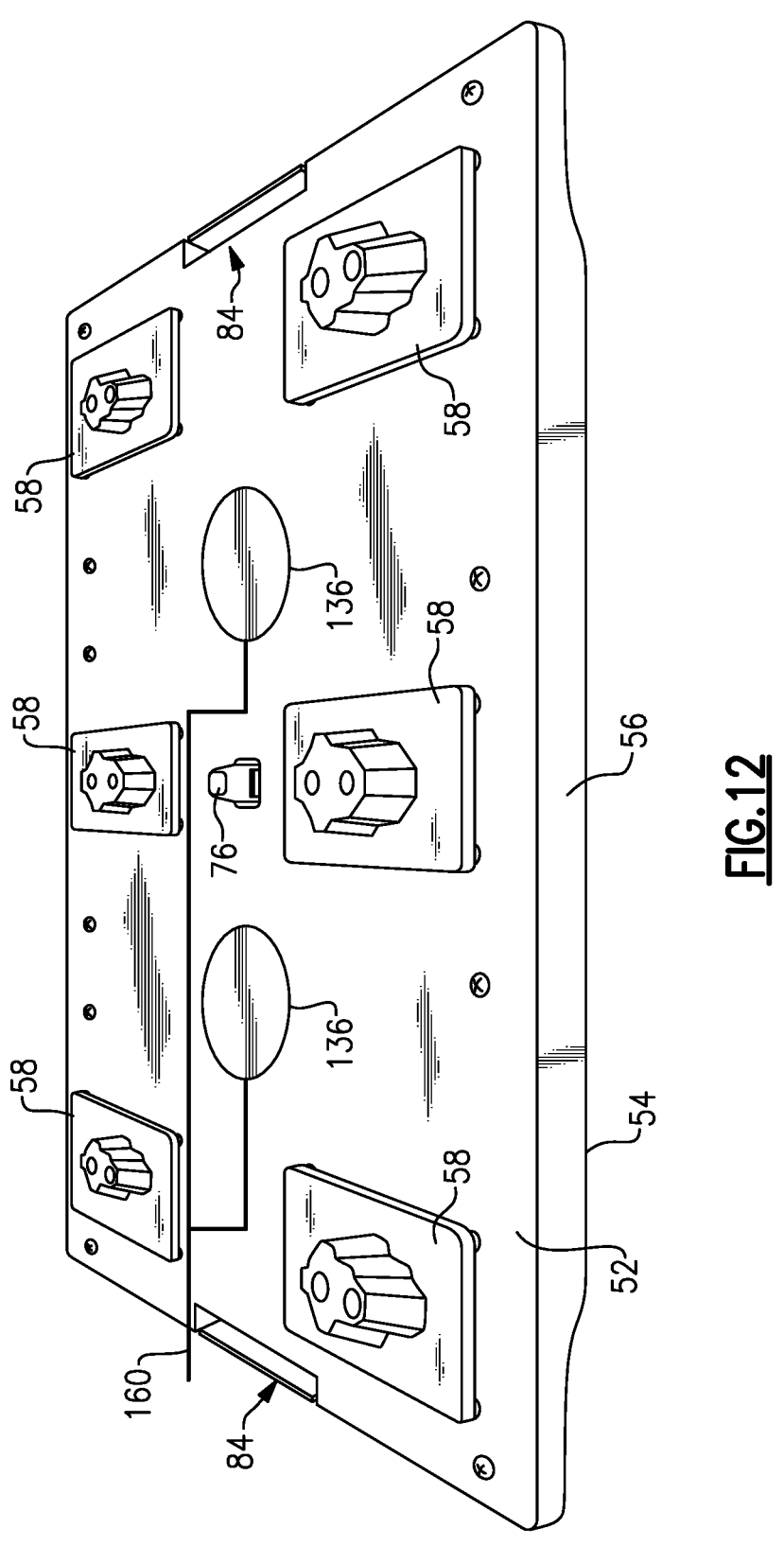
FIG. 12 is a bottom view of an example adaptor with a charging interface and mounting feet/cleats.

It should be understood that any or all of the features in the adaptor plate 132 shown in FIG. 11 can be incorporated into the adaptor plates of FIGS. 3-8. FIG. 12 shows one example where the plate 56 includes the mounting cleats/feet 58 and one or more adaptor charging members 136. The adaptor charging members 136 provide inductive charging to an accessory via the converter 140 or DC power can be supplied as indicated at 160.

In each of the examples, the adaptors can be formed from a molded plastic material, for example. The mounting cleats/ feet can be separately attached to the first side of the adaptors, or the cleats/feet can be integrally formed with the adaptors.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An adaptor for an accessory attachment system, comprising:
   a body having a first side mountable to a base plate and a second side opposite of the first side, wherein the base plate includes mounting apertures extending through a thickness of the base plate;
   wherein the first side has a first mounting configuration that is configured to be received within a first pattern of the mounting apertures on a base plate;
   wherein the second side has a second mounting configuration that is different than the first mounting configuration, wherein the second mounting configuration comprises accessory engagement portions formed within the second side that are selectively engageable with a second pattern of mounting areas on an accessory, wherein the second pattern is different than the first pattern, and wherein the accessory engagement portions are engageable with the accessory such that the accessory is attached to the base plate via the body when the first mounting configuration is received within the first pattern of the mounting apertures; and
   a latch that is configured to secure the body to the base plate, wherein the latch is received within a recess formed within the second side and includes a latching portion that protrudes through an opening in the body and outward away from the first side.

2. The adaptor of claim 1, wherein the body comprises a plate having a plurality of cleats extending outwardly of the first side to provide the first mounting configuration, and the plate having a plurality of recesses, a plurality of protrusions, and/or at least one latching feature on the second side that comprise the accessory engagement portions, and wherein the mounting areas on the accessory engage with the plurality of recesses, the plurality of protrusions, and/or the at least one latching feature and secure the accessory to the body.

3. The adaptor of claim 1, wherein the latch comprises a lever arm that is movable between a latched position and an unlatched position, and including a resilient member that biases the lever arm to the latched position, and wherein a distal end of the lever arm includes the latching portion.

4. The adaptor of claim 1, wherein the mounting apertures are provided at multiple locations on the base plate, and wherein the mounting apertures are formed in a desired pattern on the base plate to provide different mounting locations and orientations, and wherein:
   the body comprises a plate having a plurality of cleats extending outwardly of the first side to provide the first mounting configuration, wherein the adaptor is positionable within any of the different mounting locations and orientations on the base plate via the first mounting configuration; and
   the plate includes at least one latching feature on the second side that is configured to couple with the accessory.

5. The adaptor of claim 1, wherein the body is comprised of a material that has long persistent phosphor molded within to provide passive lighting for a predetermined amount of time, and/or wherein the body includes an integrated lighting element.

6. The adaptor of claim 1, wherein the body includes a power transfer area configured to transfer power from the base plate to the accessory via the body.

7. The adaptor of claim 6, wherein the power transfer area comprises a body charging member configured to interact with a base plate charging member and including a connector interface to connect the accessory to the body charging member for direct charging.

8. The adaptor of claim 6, wherein the power transfer area comprises a converter and an inductive charging member configured to interact with a base plate inductive charging member for inductive charging of the accessory via an accessory inductive charging member.

9. An accessory attachment system, comprising:
  a plurality of accessories includes at least a first type of accessory and a second type of accessory that is different than the first type of accessory;
  a base plate including a plurality of apertures, wherein at least a first set of apertures of the plurality of apertures provides a first mounting configuration that receives first engagement portions of the first type of accessory mountable on the base plate; and
  an adaptor having a first side with the first mounting configuration and a second side having a second mounting configuration that is different than the first mounting configuration such that the second mounting configuration receives second engagement portions of the second type of accessory mountable to the base plate via the adaptor.

10. The accessory attachment system of claim 9, wherein the adaptor comprises a plate having a plurality of cleats extending outwardly of the first side to provide the first mounting configuration, and the plate having a plurality of recesses, a plurality of depressions, and/or at least one latching feature on the second side that comprise the second mounting configuration.

11. The accessory attachment system of claim 9, wherein the adaptor includes a latch that is configured to secure the adaptor to the base plate, wherein the latch is received within a recess formed within the second side and includes a latching portion that protrudes through an opening in the adaptor and outward away from the first side.

12. The accessory attachment system of claim 11, wherein the latch comprises a lever arm that is movable between a latched position and an unlatched position, and including a resilient member that biases the lever arm to the latched position, and wherein a distal end of the lever arm includes the latching portion.

13. The accessory attachment system of claim 9, wherein the first set of apertures are provided at multiple locations on the base plate, and wherein the first set of apertures are formed in a desired pattern on the base plate to provide different mounting locations and orientations, and wherein:
  the adaptor comprises a plate having a plurality of cleats extending outwardly of the first side to provide the first mounting configuration, wherein the adaptor is positionable within any of the different mounting locations and orientations on the base plate via the first mounting configuration; and
  the plate having at least one latching feature on the second side that is configured to couple with the second type of accessory.

14. The accessory attachment system of claim 9, wherein the adaptor is comprised of a material that has long persistent phosphor molded in to provide passive lighting for a predetermined amount of time, and/or wherein the adaptor includes an integrated lighting element.

15. The accessory attachment system of claim 9, wherein the adaptor includes a power transfer area configured to transfer power from the base plate to the accessory via the adaptor, and wherein the power transfer area comprises an adaptor charging member configured to interact with a base plate charging member and including a connector to connect to the accessory to the adaptor charging member for direct charging.

16. The accessory attachment system of claim 9, wherein the adaptor includes a power transfer area configured to transfer power from the base plate to the accessory via the adaptor, and wherein the power transfer area comprises a converter and an adaptor inductive charging member configured to interact with a base plate inductive charging member for inductive charging of the accessory via an accessory inductive charging member.

17. The accessory attachment system of claim 9, wherein the base plate extends above a floor of a vehicle cargo bed and is supportable for sliding movement within the vehicle cargo bed on one or more sliding structures.

18. The accessory attachment system of claim 9, wherein the adaptor comprises a plate having a set of cleats extending outwardly of the first side to provide the first mounting configuration, and wherein the set of cleats are inserted through first set of apertures in the base plate and are slidable in a first direction relative to the base plate to a position where the adaptor cannot be pulled away from the base plate, and wherein to remove the adaptor, the plate is slid in an opposite direction until the set of cleats is aligned with the first set of apertures and the adaptor is removeable from the base plate.

19. The accessory attachment system of claim 9, wherein the plurality of apertures includes at least a plurality of mounting apertures that include the first set of apertures and a plurality of locking apertures that are separate from the plurality of mounting apertures, and wherein the adaptor includes a latch that latches the adaptor to the base plate, and wherein the latch includes at least one latching portion that is received within one of the plurality of locking apertures.

20. The adaptor of claim 1, wherein the base plate extends above a floor of a vehicle cargo bed and is supportable for sliding movement within the vehicle cargo bed on one or more sliding structures.

21. An adaptor for an accessory attachment system, comprising:
  a body having a first side mountable to a base plate and a second side opposite of the first side, wherein the base plate includes mounting apertures extending through a thickness of the base plate;
    wherein the first side has a first mounting configuration that is configured to be received within a first pattern of the mounting apertures on a base plate;
    wherein the second side has a second mounting configuration that is different than the first mounting configuration, wherein the second mounting configuration comprises accessory engagement portions formed within the second side that are selectively engageable with a second pattern of mounting areas on an accessory, wherein the second pattern is different than the first pattern, and wherein the accessory engagement portions are engageable with the accessory such that the accessory is attached to the base plate via the body when the first mounting configuration is received within the first pattern of the mounting apertures; and wherein the adaptor comprises a plate having a set of cleats extending outwardly of the first side to provide the first mounting configuration, and wherein the set of cleats are inserted through the mounting apertures in the base plate and are slidable in a first direction relative to the base plate to a position where the adaptor cannot be pulled away from the base plate, and wherein to remove the adaptor, the plate is slid in an opposite direction until the set of cleats is aligned with the mounting apertures and the adaptor is removeable from the base plate.

22. The adaptor of claim 1, wherein the base plate includes a plurality of locking apertures that are separate from the mounting apertures, and wherein the adaptor includes a latch that latches the adaptor to the base plate, and wherein the latch includes at least one latching portion that is received within one of the plurality of locking apertures.

23. An accessory attachment system comprising:

a base plate including a plurality of apertures comprising at least mounting apertures provided at multiple locations on the base plate, and wherein the mounting apertures are formed in a desired pattern on the base plate to provide different mounting locations;

an adaptor having a first side with a first mounting configuration and a second side having a second mounting configuration that is different than the first mounting configuration;

wherein:

the first mounting configuration corresponds to first engagement portions of a first type of accessory mountable on the base plate;

the second mounting configuration corresponds to second engagement portions of a second type of accessory mountable on the base plate;

at least a first set of the mounting apertures of the base plate cooperates with the first mounting configuration of the adaptor; and the second mounting configuration of the adaptor receives second engagement portions of the second type of accessory;

wherein the mounting apertures are provided at multiple locations on the base plate; and wherein the mounting apertures are formed in a desired pattern on the base plate such that the adaptor and the first and second types of accessories are mountable in various different locations and orientations on the base plate.

\* \* \* \* \*